United States Patent
Couleaud et al.

(10) Patent No.: US 9,462,300 B2
(45) Date of Patent: Oct. 4, 2016

(54) DISTRIBUTED SEAT CENTRIC WIRELESS IN-FLIGHT ENTERTAINMENT SYSTEM

(71) Applicant: Thales Avionics, Inc., Irvine, CA (US)

(72) Inventors: Jean-Yves Couleaud, Mission Viejo, CA (US); Tracy Decuir, Yorba Linda, CA (US); John Howard Darvell, Claremont, CA (US)

(73) Assignee: Thales Avionics, Inc., Irvine, CA (US)

( * ) Notice: Subject to any disclaimer, the term of this patent is extended or adjusted under 35 U.S.C. 154(b) by 188 days.

(21) Appl. No.: 14/328,894

(22) Filed: Jul. 11, 2014

(65) Prior Publication Data
US 2015/0245078 A1    Aug. 27, 2015

Related U.S. Application Data

(60) Provisional application No. 61/942,711, filed on Feb. 21, 2014.

(51) Int. Cl.
| | |
|---|---|
| *H04W 4/00* | (2009.01) |
| *H04N 21/214* | (2011.01) |
| *H04N 21/4363* | (2011.01) |
| *H04N 21/231* | (2011.01) |
| *H04N 21/258* | (2011.01) |
| *H04N 21/262* | (2011.01) |
| *H04N 21/414* | (2011.01) |
| *H04N 21/647* | (2011.01) |

(52) U.S. Cl.
CPC .... *H04N 21/2146* (2013.01); *H04N 21/23109* (2013.01); *H04N 21/25841* (2013.01); *H04N 21/26291* (2013.01); *H04N 21/41422* (2013.01); *H04N 21/43637* (2013.01); *H04N 21/64784* (2013.01); *H04N 21/214* (2013.01); *H04N 21/4363* (2013.01)

(58) Field of Classification Search
CPC ........... H04N 21/214; H04N 21/4363; H04N 21/2146; H04N 21/43637
USPC .................... 370/338, 395.4, 395.41, 395.42
See application file for complete search history.

(56) References Cited

U.S. PATENT DOCUMENTS

| | | | |
|---|---|---|---|
| 7,496,361 B1 * | 2/2009 | Mitchell ................. | H04L 67/12 455/423 |
| 2006/0229104 A1 * | 10/2006 | de La Chapelle . | H04B 7/18506 455/562.1 |
| 2009/0077595 A1 | 3/2009 | Sizelove et al. | |
| 2010/0281100 A1 * | 11/2010 | Benco ................ | B64D 11/0015 709/203 |
| 2011/0174926 A1 | 7/2011 | Margis et al. | |
| 2011/0314490 A1 | 12/2011 | Keen et al. | |
| 2013/0159478 A1 * | 6/2013 | Rousu ............... | H04W 52/0229 709/221 |
| 2013/0272211 A1 * | 10/2013 | Quan .................. | H04B 7/0452 370/329 |
| 2014/0344467 A1 * | 11/2014 | Eckert ..................... | H04L 69/03 709/230 |

* cited by examiner

*Primary Examiner* — Farah Faroul
(74) *Attorney, Agent, or Firm* — Myers Bigel & Sibley, P.A.

(57) ABSTRACT

Some embodiments of the present disclosure are directed to an entertainment system that includes a plurality of wireless access points. Each wireless access point includes a mass memory, at least one radio transceiver, and at least one processor. The at least one radio transceiver is configured to communicate with seat display devices and to communicate with personal electronic devices of users. The processor is configured to receive entertainment content, which includes a plurality of content items, through the at least one radio transceiver, and to store the entertainment content in the mass memory. The processor downloads the entertainment content using a file transfer protocol from the mass memory to the seat display devices through the at least one radio transceiver, and streams the content items of the entertainment content using a streaming protocol from the mass memory to the personal electronic devices of users through the at least one radio transceiver.

18 Claims, 8 Drawing Sheets

Smart Wireless Access Point (SWAP)
System Architecture

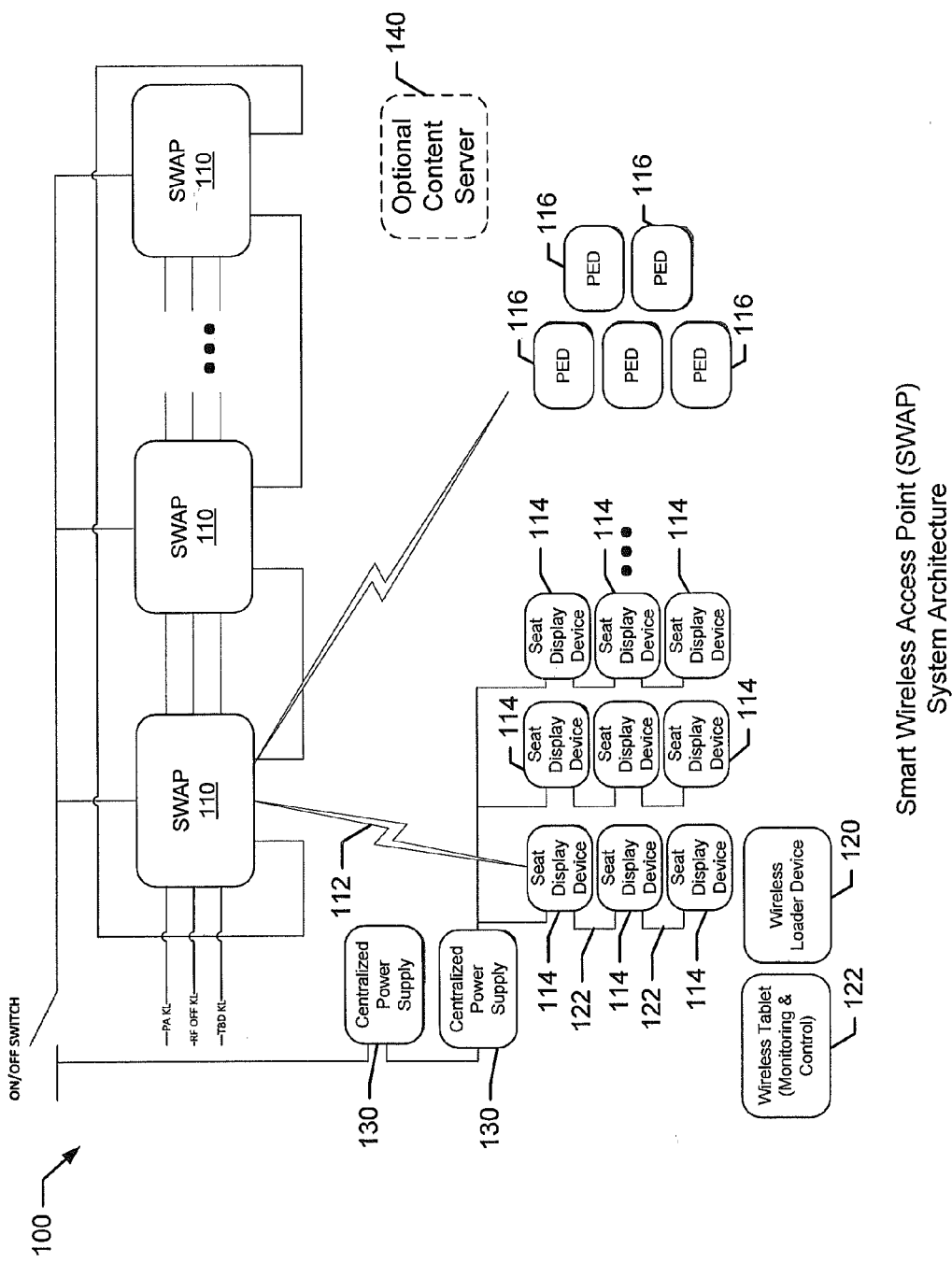

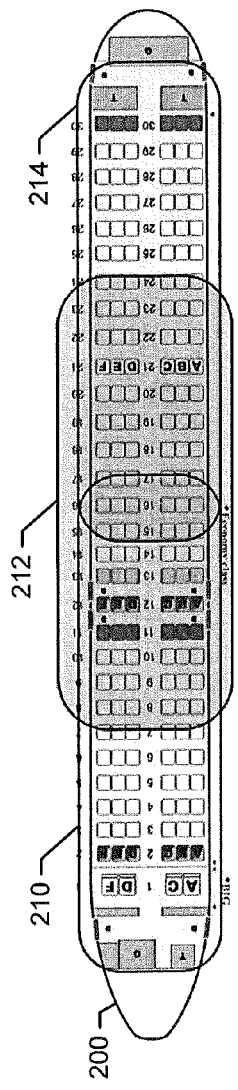
Figure 2 (PRIOR ART) — Communication Service Areas Provided by 3 Convention WAPS
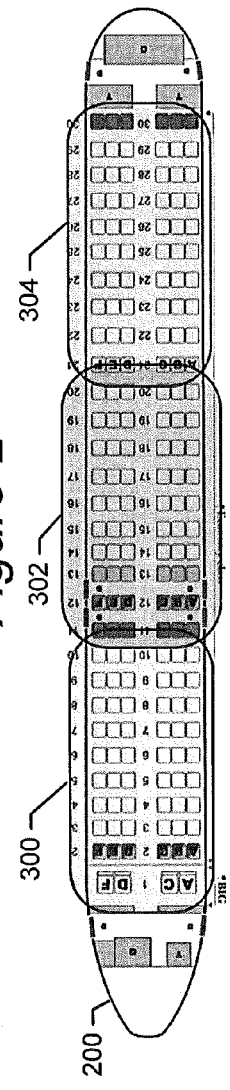
Figure 3 — Communication Service Areas Provided by 3 SWAPS
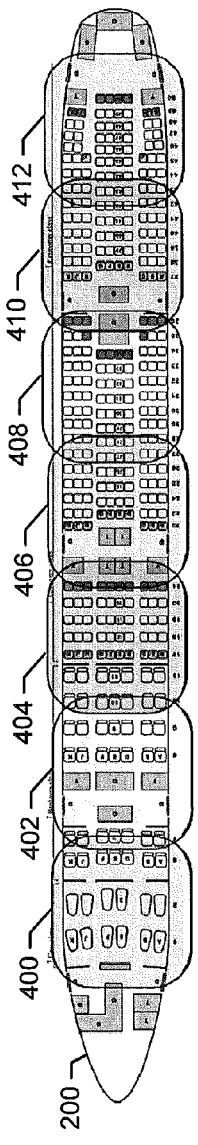
Figure 4 — Communication Service Areas Provided by 7 SWAPS in Dense Communication Environment

DISTRIBUTED SEAT CENTRIC WIRELESS IN-FLIGHT ENTERTAINMENT SYSTEM

CROSS-REFERENCE TO RELATED APPLICATION

This application claims priority to U.S. Provisional Application No. 61/942,711, filed Feb. 21, 2014, the disclosure and content of which is incorporated herein by reference in its entirety as if set forth fully herein.

TECHNICAL FIELD

The present disclosure relates to vehicle entertainment systems and, more particularly, in-flight entertainment systems.

BACKGROUND

In-flight entertainment (IFE) systems are deployed onboard aircraft to provide entertainment services for passengers in a passenger cabin. The IFE systems typically provide passengers with television and audio multimedia entertainment programming.

One type of IFE system is a "server centric" architecture where multimedia content is located on a server or a set of servers installed in an electronic bay somewhere in the airplane. Video content is played through displays installed at overhead locations or within seatbacks, and associated audio content is played through jacks provided in seat armrests.

Another type of IFE system is a "seat centric" architecture where content is stored in mass data storage devices located at individual seats and played through associated seat displays. The server (or set of servers) acts as an injection point for content that will be later installed locally into the seat mass data storage devices, and also acts as a secondary source for content that may not fit in the seat mass data storage devices.

Cabin crew (e.g., flight attendants) can operate control panels to control the IFE entertainment system. The control panels can include computer monitors and optional peripherals installed at spaced apart locations within the cabin that are accessible to the cabin crew during flight operations.

There has also been an emergence of wireless systems providing connectivity to passenger devices (i.e. Internet access) as well as limited streaming entertainment (i.e movies). These systems typically require less installation effort and are limited to using servers installed in electronic bays somewhere in the airplane that stream content and communication control commands through wireless access points installed at spaced apart locations in overhead compartments of the airplane.

IFE installations can use substantial aircraft resources, such as equipment bay space, electrical power, weight, and cost. Each of the seat devices of an IFE system are typically networked through lengthy, heavy, and costly data network cabling to one or more servers to communicate commands and receive content.

Because of these components and network cabling, each IFE system is customized to each particular aircraft layout, referred to as a Layout of Passenger Accommodations (LOPA). Differences in architectures and layouts of IFE systems between aircraft necessitates separate and independent testing and verification by IFE vendors and customers.

In addition, structural supports need to be designed and installed in the aircraft fuselage to support the IFE system components (e.g., server(s)), which is a major contributor to the overall weight of the IFE system. Control panels and network cabling are also a major contributors to overall weight because of the structures that are needed for their support.

The processes for accessing equipment bays where servers are typically installed are complicated and require highly trained technicians. Moreover, costly and lengthy processes may be necessary to obtain airplane manufacturer/owner approvals for modification of equipment bays for IFE system components. Also, data network paths need to be created between electronic bays and the cabin where seat displays are located, the long runs of network cable are inherently heavy and costly.

When a wireless communication system is installed onboard an airplane, wireless access points can be configured and spaced apart along the cabin to reduce interference with each other. Avoiding excessive interference limits the total number of wireless access points that can be installed in an airplane and constrains the available communication bandwidth and number of clients that can be served.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

Some embodiments of the present disclosure are directed to an entertainment system that includes a plurality of wireless access points. Each wireless access point includes a mass memory, at least one radio transceiver, and at least one processor. The at least one radio transceiver is configured to communicate with seat display devices and to communicate with personal electronic devices of users. The processor is configured to receive entertainment content, which includes a plurality of content items, and to store the entertainment content in the mass memory. The processor downloads the entertainment content using a file transfer protocol from the mass memory to the seat display devices through the at least one radio transceiver, and streams the content items of the entertainment content using a streaming protocol from the mass memory to the personal electronic devices of users through the at least one radio transceiver.

Other systems, apparatus, and methods according to embodiments of the present disclosure will be or become apparent to one with skill in the art upon review of the following drawings and detailed description. It is intended that all such additional systems, apparatus, and methods be included within this description and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIG. 1 illustrates an IFE system that includes Smart Wireless Access Points (SWAPs) that are configured according to some embodiments of the present invention;

FIG. 2 illustrates wireless communication coverage areas provided by three conventional WAPs within an aircraft fuselage;

FIG. 3 illustrates the operation of three SWAPs that are configured to operate to provide substantially non-overlapping coverage areas in accordance with some embodiments of the present disclosure;

FIG. 4 illustrates the operation of seven SWAPs that are configured to operate to provide substantially non-overlapping coverage areas in a dense communication environment in accordance with some embodiments of the present disclosure;

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Various embodiments of IFE systems are disclosed that can provide one or more of the following advantages and solutions:

Reduce/eliminate seat network cabling using wireless communication networks;

Provide wireless mobile terminals configured to operate as crew control panels for IFE systems;

Integrate content server capabilities into wireless access points which may be installed in the overhead section of the airplane, and which may reduce the cost and weight of the IFE system;

Provide equipment and operations for wirelessly loading content onto seat IFE devices, which can eliminate the need for seat to seat data networks and thereby simplify installation and reduce weight of the IFE system; and Provide dynamic control over service areas of the wireless access points to allow more wireless access points to be installed in a cabin, and increase the number of available communication frequencies that can be used by each of the wireless access points within a cabin while providing acceptable levels of interference between the wireless access points.

Although various embodiments are explained herein in the context of entertainment systems for an In-Flight Entertainment (IFE) environment of an aircraft, other embodiments of the entertainment systems are not limited thereto and may be used in other types of vehicles, including ships, buses, trains, and automobiles, and for non-vehicle installations for conference centers, buildings, etc.

Smart Wireless Access Point (SWAP)

FIG. 1 illustrates an IFE system 100 that includes Smart Wireless Access Points (SWAPs) 110. The term "SWAP" is used herein in a non-limiting manner. A SWAP is more broadly also referred to as a wireless access point is configured to communicate through a wireless interface communication link with a plurality of seat display devices and/or personal electronic devices. A SWAP or wireless access point may be used within an entertainment system or other communication system according to various embodiments disclosed herein.

The SWAPs 110 can be deployed (mounted) at spaced apart locations within an aircraft fuselage to provide corresponding wireless service areas to seat display devices 114 and personal electronic devices (PEDs) 116. The PEDs 116 which may correspond to any personal electronic device having wireless communications capabilities that can be carried by a passenger onto an aircraft, including, without limitation, tablet computers, laptop computers, palmtop computers, cellular smart phones, media players, etc.

Figure 5:
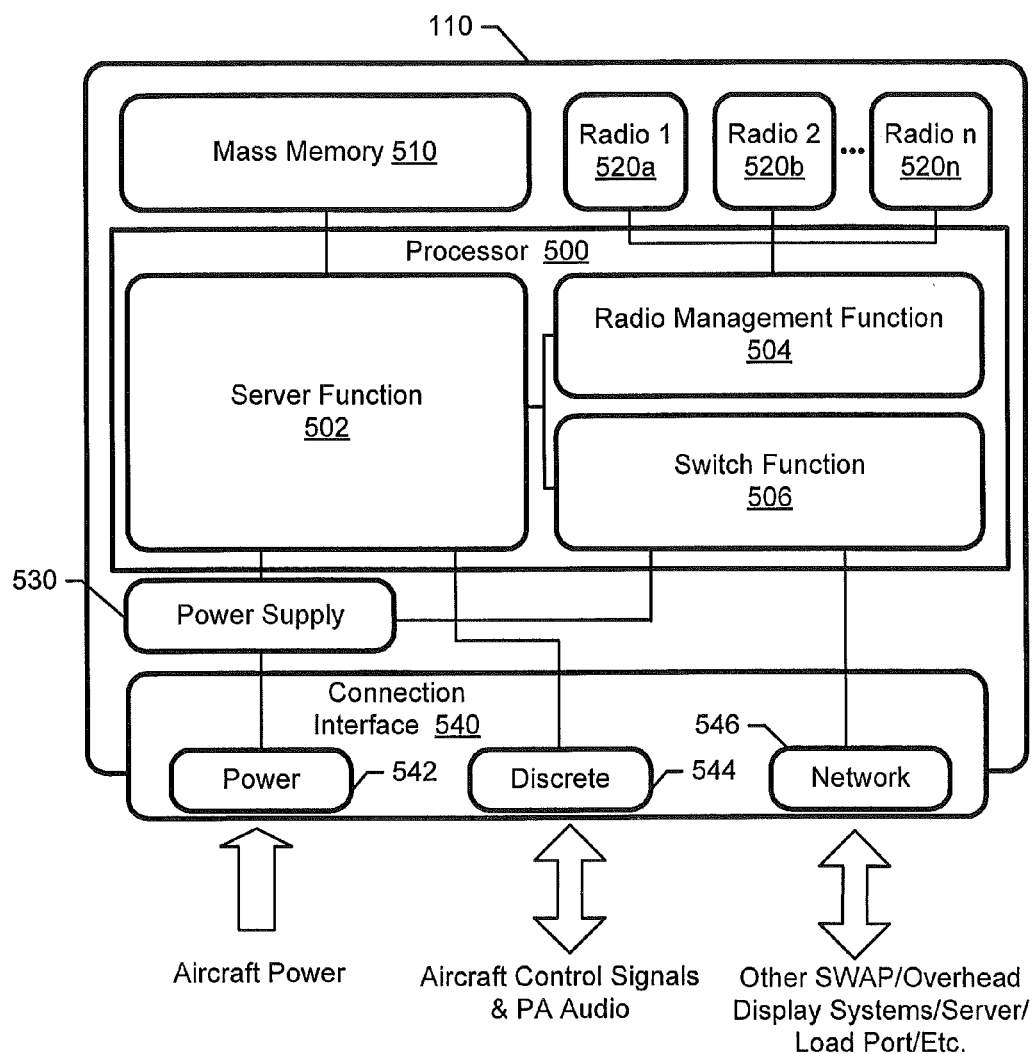
FIG. 5 is a block diagram of a SWAP configured according to some embodiments of the present disclosure.
Figure 6:
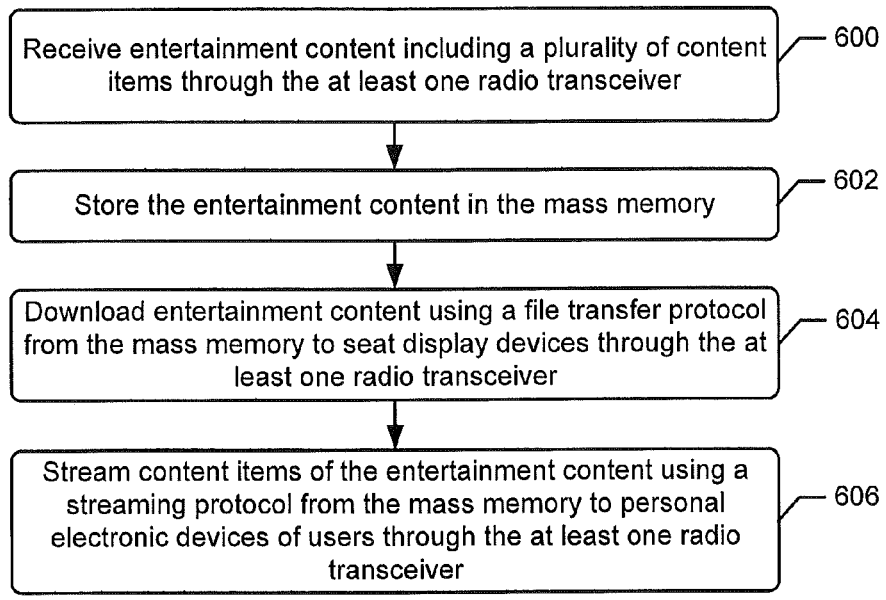
FIGS. 6-12 are flowcharts of operations and methods that may be performed by one or more SWAPs of an entertainment system in accordance with some embodiments of the present disclosure.

Each SWAP 110 is configured to store content within a mass data storage device (mass memory) and to communicate content from the mass memory through a wireless communication link 112 to memory (mass memory) within each of the seat display devices 114. In the embodiments of FIGS. 5 and 6, each wireless access point includes a mass memory 510, at least one radio transceiver 520, and a processor 500. The at least one radio transceiver 520 configured to communicate with the seat display devices 114 and to communicate with personal electronic devices 116 of users. The processor 500 is configured to receive (block 600) entertainment content comprising a plurality of content items through the at least one radio transceiver. The processor 500 stores (block 602) the entertainment content in the mass memory 510. The processor 500 downloads (block 604) entertainment content using a file transfer protocol from the mass memory 510 to the seat display devices 114 through the at least one radio transceiver 520, and streams (block 606) content items of the entertainment content using a streaming protocol from the mass memory 510 to the personal electronic devices 116 of users through the at least one radio transceiver 520.

The processor 500 controls where content is distributed, when content is distributed, and the relative prioritization of the receipt of content into the associated SWAP 110 and distribution of content to the various seat display devices 114 and personal electronic devices 116.

In one embodiment, the processor 500 allocate resources of a plurality of radio transceivers 520 so that content is communicated to the seat display devices 114 at a quality of service that is not necessarily sufficient to support real-time streaming display on the seat display devices 114. For example, the content may be communicated to the seat display devices 114 as a background communication task having insufficient bandwidth, excessive delay in delivery of content packets, excessive bit error rate, and/or excessive packet retransmission delays to support real-time streaming of video that would provide an acceptable quality when displayed on the seat display devices 114 (e.g., video is not interrupted, jittery, or displayed at degraded resolution due to insufficient network quality of service). The seat display device 114 may be within a seatback or armrest of each passenger seat, or the display device 114 may be installed in other locations such as within bulkheads or ceiling structures.

In sharp contrast, prior art IFE systems stream content in real-time from a server, mounted somewhere within the aircraft, through a WAP and wireless interface to passenger electronic devices. The prior art WAP did not store the content for later distribution to passenger electronic devices. Consequently, the end-to-end communication networks from the server through the WAP to the seat display devices or passenger electronic devices must have sufficient capacity to provide guaranteed high-bandwidth low latency network communications and satisfy other quality of service requirements (e.g., bit error rate, packet retransmission rate, low jitter rate, etc.). In sharp contrast to such prior art IFE systems, some embodiments of the present disclosure enable content from the mass memory of the SWAP 110 to be communicated as a background communication task (at less network bandwidth and quality of service than required for real-time streaming) to load mass memory resident in the seat display devices 114.

In one embodiment, each of the seat display devices 114 contains or is locally connected to a mass memory having sufficient data storage capacity to store a plurality of items of entertainment content, such as audio content (e.g., songs, etc.), audio-video content (e.g., movies, television programs, etc.), and/or games or other applications executable by processors of the seat display devices 114. The different audio content, audio-video content, and games or other applications are also referred to herein as content items.

A SWAP 110 downloads through a wireless interface 112 a plurality of content items to the mass memory in each of the seat display devices or is locally networked to a plurality of the seat display devices. A passenger can operate a user interface associated with the passenger's seat display device to select among the content items from the internal or local mass memory, and cause the selected content item to be played through a display and/or audio jack associated with the seat display device 114.

The user interface may further display a content item that is missing from the internal or local mass memory of the seat display device 114 but which is known to reside in the mass data storage device of the SWAP 110. Based on a passenger selecting a content item that is not stored internally or local to the seat display device 114, a command can be transmitted through the wireless interface 112 to the SWAP 110 to cause the content item to be downloaded to the internal or local mass memory of the seat display device 114 for playing to the passenger.

In another embodiment, the SWAP 110 may download passenger selected content items on-demand to individual seat display devices 114. A content item may be downloaded as a file to memory of a seat display device 114 responsive to a user request for that content item. Playback of the content item may be restricted to occurring after the file has been completely downloaded to the seat display device 114, or may be allowed to begin after a threshold amount of the file has been downloaded. The threshold amount may be defined based on characteristics of the network and the ability of the downloading to keep pace with the rate at which the content items is played from the file so as to avoid interruption of playing of the content item.

Moreover, if a passenger requested content item is missing from the SWAP 110 serving the seat display device 114, the serving SWAP 110 may obtain the content item from another SWAP 110 over a wired network and/or through a wireless link. For example, in one embodiment, the processor 500 of a SWAP 110' is further configured to respond to a user request from one of the personal electronic devices 116 and a determination that a content item identified by the user request is not stored among the entertainment content in the mass memory 510, by obtaining the content item from the mass memory 510 of another SWAP 110", storing the content item in the mass memory 510 of the obtaining SWAP 110', and streaming the content item using the streaming protocol from the mass memory 510 of the obtaining SWAP 110' through the at least one radio transceiver 520 to the one of the personal electronic devices 116.

In a similar manner, the processor 500 of a SWAP 110' can respond to a user request from one of the seat display devices 116 that identifies a content item that is not stored among the entertainment content in the mass memory 510 by obtaining the content item from the mass memory 510 of another one of the SWAP 110", storing the content item in the mass memory 510 of the obtaining SWAP 110', and streaming the content item using the streaming protocol from the mass memory 510 of the obtaining SWAP 110' through the at least one radio transceiver 520 to the one of the seat display devices 116.

In another embodiment, the SWAP 110 may stream a content item in real-time through the wireless interface 112 to a seat display device 114. Although such streaming again necessitates that the wireless interface 112 between the SWAP 110 and the seat display device 114 be configured to provide guaranteed high-bandwidth low latency network communications and satisfy other quality of service requirements for at least that single instance of real-time streaming, the system 100 can still benefit by avoiding the need for communication networks between the SWAPs 112 and any remote server(s) that support high-bandwidth low latency network communications.

Although various embodiments of SWAPs 110 can avoid the need for providing a content server within the aircraft, in some other embodiments a content server 140 is mounted within the aircraft and can be connected through a wireless interface or wired interface (e.g., Ethernet) to load content to the mass memory of the SWAPs 110. The content can be loaded by non-real-time file transfer to the SWAP 110, which can substantially reduce the bandwidth and quality of service requirements for the network connecting the content server 140 to the SWAPs 110.

A SWAP 110 may download a content item to a particular PED 116 responsive to a request message from the particular PED 116 to receive the content item. The content item may be downloaded as a file to memory of the particular PED 116 responsive to the request message for the content item, and for subsequently playback through the PED 116, or the content item may be streamed in real-time through a wireless interface.

Accordingly, the SWAP 110 may provide the same non-real-time file transfer wireless interface for download of content files to the seat display devices 114 and the PEDs 116. Alternatively, the SWAP 110 may provide a non-real-time file transfer wireless interface for download of content files to the seat display devices 114 and a different real-time wireless interface for streaming of content to the PEDs 116. Using non-real-time file transfer can allow a single SWAP 110 to provide content delivery services to a greater number of passengers via seat display devices 114 and the PEDs 116, and to perform the delivery at a higher quality and/or with less quality of service requirements being imposed on the SWAP 110.

In one embodiment, the processor 500 of each of the SWAPs 110 is further configured to prevent streaming of content items of the entertainment content to the personal electronic devices 116 until completion of the downloading of the entertainment content to the seat display devices 114. Thus, for example, when the entertainment system is part of an in-flight entertainment system within an aircraft, the available communication resources can be dedicated to quickly downloading a substantial amount of entertainment content items to the mass memory of the seat display devices 114 while the aircraft is on the ground. Thereafter, the communication resources can be used for streaming real-time video and audio to the personal electronic devices 116 without those communications being burdened with downloading of entertainment content to the seat display devices 114. Moreover, the communication bandwidth requirements for the radio transceivers 520 may be reduced and/or fewer SWAPs 110 may be capable of servicing more seat display devices 114 and/or personal electronic devices 116 by this approach of prioritizing downloading of entertainment content items to the seat display devices, such as while the aircraft is on the ground, over streaming of real-time video and audio to the personal electronic devices 116.

Instead of precluding simultaneous downloading of entertainment content items to the seat display devices and streaming of content to the personal electronic devices 116, the processor 500 of each of the SWAPs 110 can be configured to prioritize one over the other in order to ensure that the content streaming is provided with a sufficient quality of service that is acceptable for real-time viewing or other use of the content.

Figure 7:
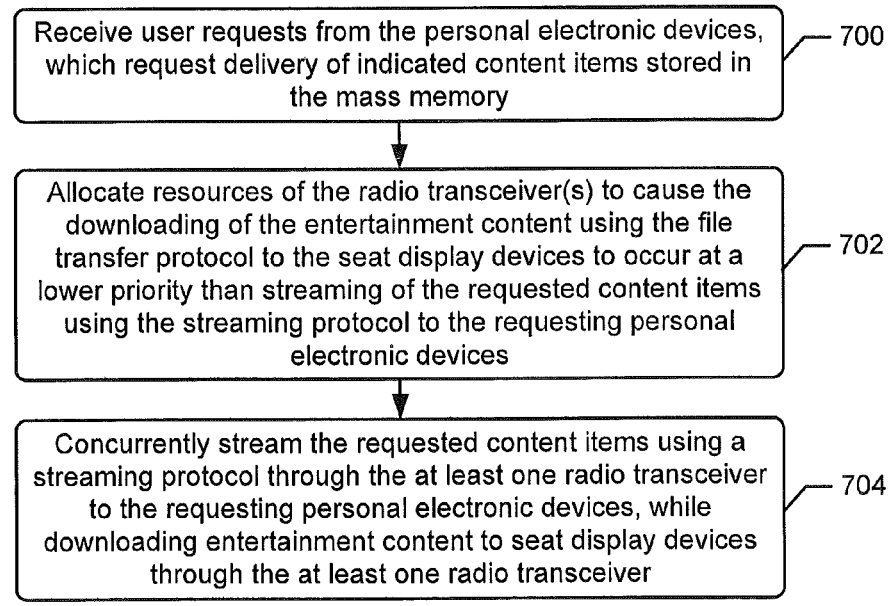

Referring to the embodiment of FIG. 7, the processor 500 of each of the SWAPs 110 can be configured to receive (block 700) user requests from the personal electronic devices 116, where each user request from the personal electronic devices 116 requests delivery of a respectively indicated one of the content items stored in the mass memory 510 of the respective SWAP 110. The processor 500 can allocate (block 702) resources of the at least one radio transceiver 520 to cause the downloading of the entertainment content using the file transfer protocol through the at least one radio transceiver 520 to the seat display devices 114 to occur at a lower priority than the concurrent streaming of the requested content items using the streaming protocol through the at least one radio transceiver 520 to the requesting personal electronic devices 116. The processor 500 can concurrently stream (block 704) the requested content items using a streaming protocol through the at least one radio transceiver 520 to the requesting personal electronic devices 116, while downloading entertainment content to seek display devices through the at least one radio transceiver 520.

Figure 8:
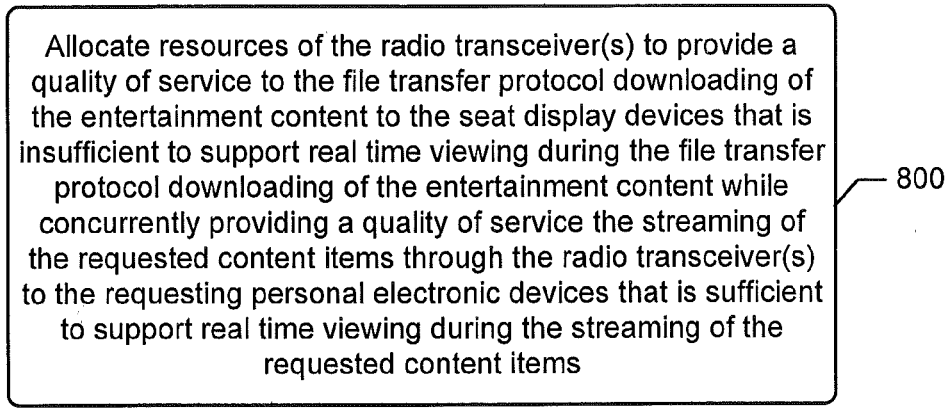

More particularly, in the further embodiment of FIG. 8, the processor 500 can allocate (block 800) resources of the at least one radio transceiver to provide a quality of service to the file transfer protocol downloading of the entertainment content to the seat display devices that is insufficient for real time viewing during the file transfer protocol downloading of the entertainment content while concurrently providing a quality of service to the streaming of the requested content items through the at least one radio transceiver to the requesting personal electronic devices that is sufficient for real time viewing during the streaming of the requested content items The plurality of SWAPs 110 can be communicatively connected in a series. For example, when the entertainment system is part of an in-flight entertainment system within an aircraft, a SWAP 110 mounted near a front of the aircraft fuselage may be configured to communicate with a nearest neighbor SWAP 110 mounted apart in the fuselage, but not be configured to communicate with more distant SWAPs 110 spaced apart further back in the fuselage. When connected in such series fashion, each of the SWAPs 110 may be configured to receive entertainment content from an upstream SWAP 110 (e.g., a SWAP located further forward in the fuselage) and to relay that entertainment content to a downstream SWAP 110 (e.g., a SWAP located further back in the fuselage). In this manner, entertainment content that is loaded onto, for example, a first SWAP 110 within the fuselage can be automatically distributed to the next SWAP 110 and so on to load the entertainment content onto the other SWAPs 110 within the fuselage.

Figure 9:
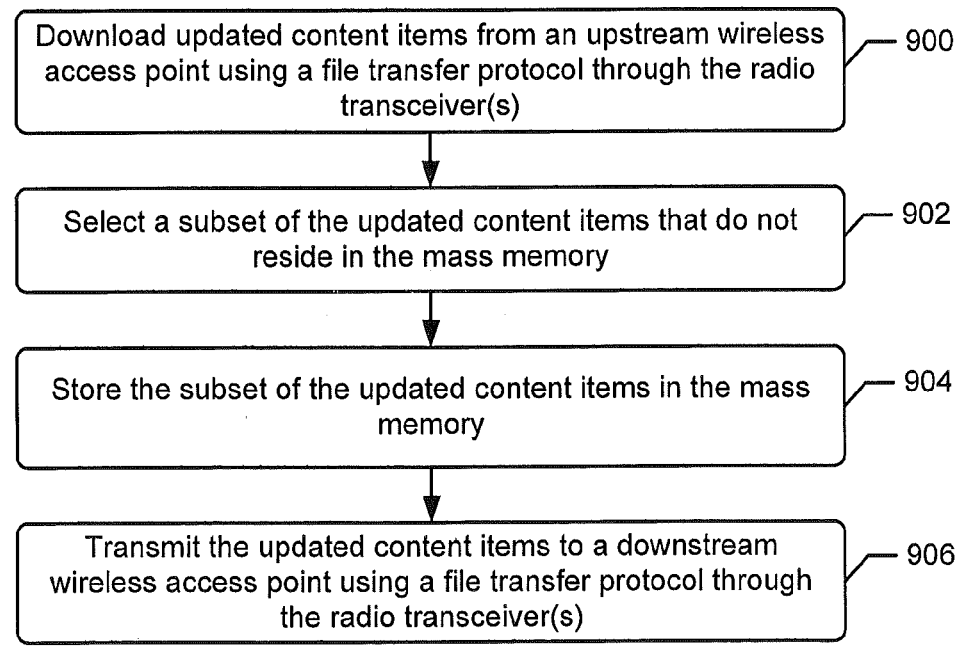

In the embodiment of FIG. 9, the processor 500 of at least some of the SWAPs 110 is further configured to download (block 900) updated content items from an upstream SWAP 110 using a file transfer protocol through the at least one radio transceiver 520. The processor 500 selects (block 902) a subset of the updated content items that do not reside in the mass memory, stores (block 904) the subset of the updated content items in the mass memory, and transmits (block 906) the updated content items to a downstream SWAP 110 using a file transfer protocol through the at least one radio transceiver 520.

In a further embodiment, a wireless loader device 120 operates to load a plurality of content items from its mass data storage device to the mass data storage device of a SWAP 110. The wireless loader device 120 may be configured to concurrently load content items into a plurality of SWAPs 110. Alternatively, a plurality of wireless loader devices 120 may be paired with a corresponding plurality of SWAPs 110 to load content items (e.g., 3 wireless loader devices 120 are used to concurrently load content into 3 SWAPs 110). The wireless loader device 120 may, for example, include a laptop computer or tablet computer.

The wireless loader device 120 may also load operational software to the SWAP 110 to update operation of the SWAP 110 and/or for relay to the seat display devices 114 to update their operation. The wireless loader device 120 may be portable or transportable so that it can be carried onto an aircraft or other vehicle to update content in a SWAP 110. For example, the processor 500 of at least ones of the SWAPs 110 is further configured to download operational software from the wireless mobile loader device 120 using a file transfer protocol through the at least one radio transceiver 520, and transmit the operational software to a downstream SWAP 110 using a file transfer protocol through the at least one radio transceiver 520, and transmit the operational software to the seat display devices 114 using a file transfer protocol through the at least one radio transceiver 520. The seat display devices 114 can then operate to update their operational software.

Figure 10:
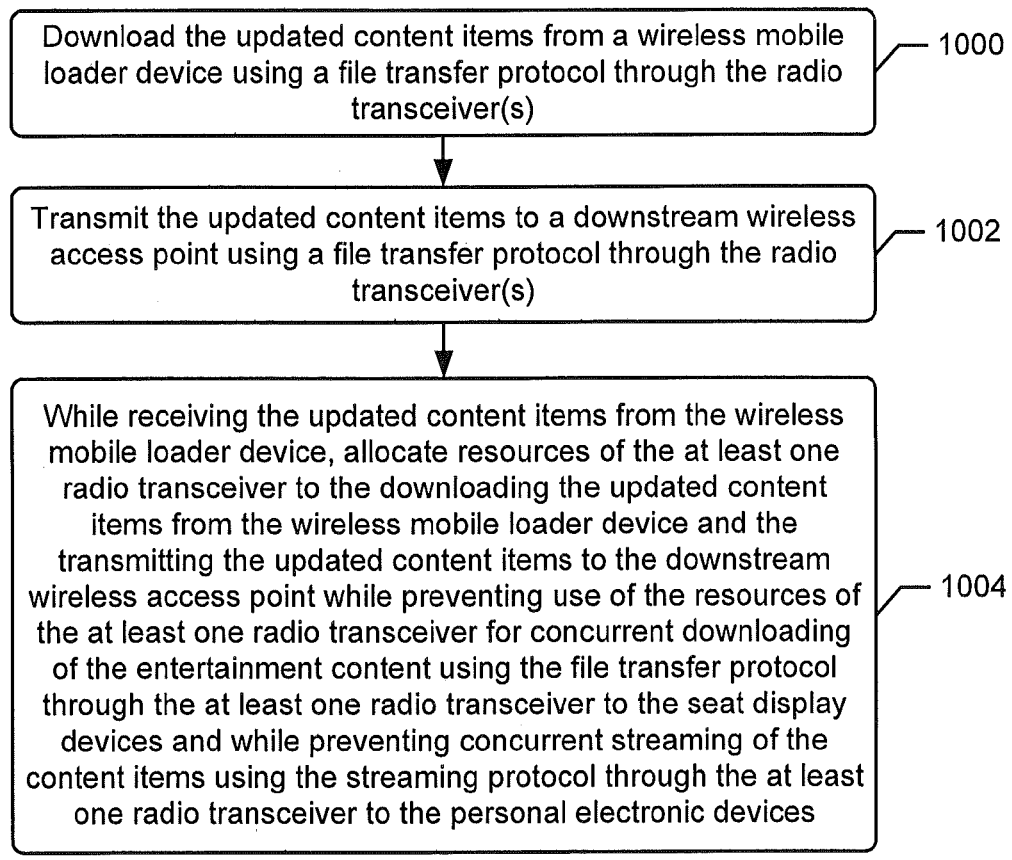

In the embodiment of FIG. 10, the processor 500 of at least some of the SWAPs 110 is further configured to download (block 1000) the updated content items from a wireless mobile loader device 120 using a file transfer protocol through the at least one radio transceiver 520, and transmits (block 1002) the updated content items to a downstream SWAP 110 using a file transfer protocol through the at least one radio transceiver 520. While receiving the updated content items from the wireless mobile loader device 120, the processor 500 can allocate (block 1004) resources of the at least one radio transceiver 520 to the downloading the updated content items from the wireless mobile loader device 120 and the transmitting the updated content items to the downstream SWAP 110 while preventing use of the resources of the at least one radio transceiver 520 for concurrent downloading of the entertainment content using the file transfer protocol through the at least one radio transceiver 520 to the seat display devices 114 and while preventing concurrent streaming of the content items using the streaming protocol through the at least one radio transceiver 520 to the personal electronic devices 116.

The wireless loader device 120 may have sufficient communication range to be able to simultaneously load content items on a plurality of the SWAPs 110. Alternatively, the wireless loader device 120 may load content items onto one of the SWAPs 110, which in turn can relay the content items to one or more other SWAPs 110 through a wired network interface 546 (e.g., network interface 546 in FIG. 3) to distribute the content among the SWAPs 110.

Content may alternatively or additionally be distributed from one SWAP 110 to one or more other SWAPs 110 through one or more radio transceivers (e.g., transceivers 520a, 520b, . . . 520n in FIG. 3), as explained above regarding FIG. 9. When a SWAP 110 is distributing content items to one or more other SWAPs 110, it may distribute all of the content items that it received from the wireless loader device 120 or it may identify particular ones of the content items that are missing from another identified SWAP 110 and distribute only the missing ones of the content items to the other identified SWAP 110.

In a further embodiment, the loader device 120 may download the updated content items through communication interface (e.g., USB interface) or wired network (e.g., Ethernet) directly into one of the SWAPs 110 for relay to the other SWAPs 110 through a wireless or wired network.

Figure 11:
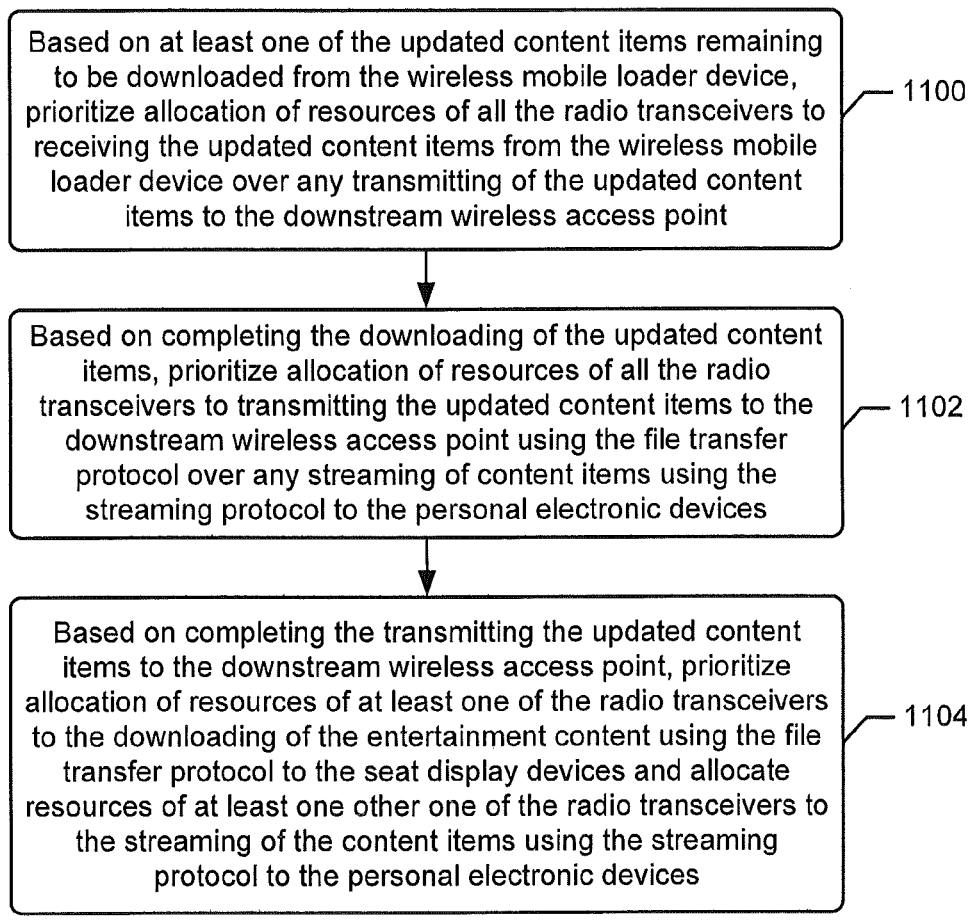

In the embodiment of FIG. 11, when each of the SWAPs 110 includes a plurality of the radio transceivers 520 (e.g., as shown in FIG. 5 by radio transceivers 520a . . . n), the processor 500 of at least some of the SWAPs 110 is further configured to, based on at least one of the updated content items remaining to be downloaded from the wireless mobile loader device 120, prioritize (block 1100) allocation of resources of all the radio transceivers 520 to receiving the updated content items from the wireless mobile loader device 120 over any transmitting of the updated content items to the downstream SWAP 110. The processor 500 may further preclude or prioritize the downloading over any distribution of content items to the seat display devices 114 and/or the personal electronic devices 116.

Based on completing the downloading of the updated content items, the processor 500 then prioritizes (block 1102) allocation of resources of all the radio transceivers 520 to transmitting the updated content items to the downstream SWAP 110 using the file transfer protocol over any streaming of content items using the streaming protocol to the personal electronic devices 116.

Based on completing the transmitting the updated content items to the downstream wireless access point, the processor 500 then prioritizes (block 1104) allocation of resources of at least one of the radio transceivers to the downloading of the entertainment content using the file transfer protocol to the seat display devices 114 and allocation of resources of at least one other one of the radio transceivers to the streaming of the content items using the streaming protocol to the personal electronic devices 116.

The flight crew can monitor and control operation of the IFE system 100 through one or more wireless electronic devices 122 (e.g., laptop computers or tablet computers with wireless communication capability).

The SWAPs 110 and the seat display devices 114 can be powered by the aircraft power system or by one or more centralized power supplies 130.

SWAP Management of Wireless Networks

While content items are being loaded from the wireless loader device 120 to a SWAP 110, other communications, including distribution of content items from the SWAP 110 to the seat display devices 114, can be disabled or relegated to a lower priority of operational handling in order to maximize available wireless communication resources that are available for use in the communications from the wireless loader device 120 to the SWAP 110.

In another embodiment, a SWAP 110 includes a communication interface configured to communicate with a content loader device through a physical wired data communication interface (e.g., Gigabit Ethernet, USB, etc.).

Content Management by the SWAPs to Provide a Dynamic Content Library at the Seat Display Devices Based on Defined Rules The operations for selecting among available content items within a SWAP 100 for download to particular seat display devices 114, and/or for controlling which content items are maintained at particular seat display devices 114, can be dynamically controlled based on one or more defined rules, which can include or not limited to:

popularity of different content items that are observed over time (e.g., track which content items have been used by passengers on seat display devices 114 to determine popularity of different content items, and control distribution of individual ones of the content items from the SWAPs 100 to the mass memory of the seat display devices 114 based on the respective popularity of the content items);

flight routes (e.g., load different content items into mass memory of display devices 114 for outgoing routes versus return routes); and control which content items are downloaded to the seat display devices 114 based on known primary languages of the originating region of a flight leg and/or destination region of a flight leg.

For example, the SWAPs 110 can contain substantially more content storage space than the seat display devices 114. In one non-limited example, the SWAPs 110 may have 600 GB of data storage capacity and the seat display devices 114 may have 100 GB of data storage capacity. If three SWAPs 110 are installed within the aircraft as part of the IFE system 100, there is potentially 1.8 TB of data storage capacity available to each of the seat display devices 114. The SWAPs 110 may operate to provide dynamic content library management that can include after each flight, the SWAPs 110 will delete some of the content items in the seat display devices 114 and replace those content items with other content items available in the SWAPs 110. The selection of which content items to delete and which content items to install (which is not necessarily a one-for-one substitution) can be based on one or more of the above-defined rules.

Sharing Content Between Seat Display Devices

Two or more seat display devices 114 may be interconnected by a wired network 122 (e.g., thin wire Ethernet, etc.) that allows transfer of content items from one of the seat display devices 114 to the other one or more of the seat display devices. For example, one seat display device 114 may receive content items from a SWAP 110 which it then distributes to one or more other seat display devices 114 that are adjacent within its row of passenger seats. The wired network 122 can be used for real-time streaming of content items or non-real-time transfer of files for each of the content items from one seat display device 114 to an adjacent seat display device 114.

Additionally or alternatively, the content items may be distributed across a direct wireless communication link, which is not relayed through the SWAP 110. Example direct wireless communication links that may be used can include, but are not limited to, wireless USB and/or direct WIFI for real-time streaming of content items or non-real-time file transfer of content items over short distances (e.g., between seat display device 114 attached to adjacent passenger seats).

In one embodiment, a plurality of the seat display devices 114 are grouped (e.g., grouped by seating rows within an aircraft) with one of the seat display devices 114 in each of the groups operating as a master device and the other seat display devices 114 in each of the groups operating as slave devices. The seat display devices 114 can include at least one radio transceiver, a processor, a mass memory, and a wired network interface. The master device communicates with the slave devices in the same group through the wired network interface via a wired network 122, wherein the wired networks of each of the groups are not directly communicatively connected.

Figure 12:
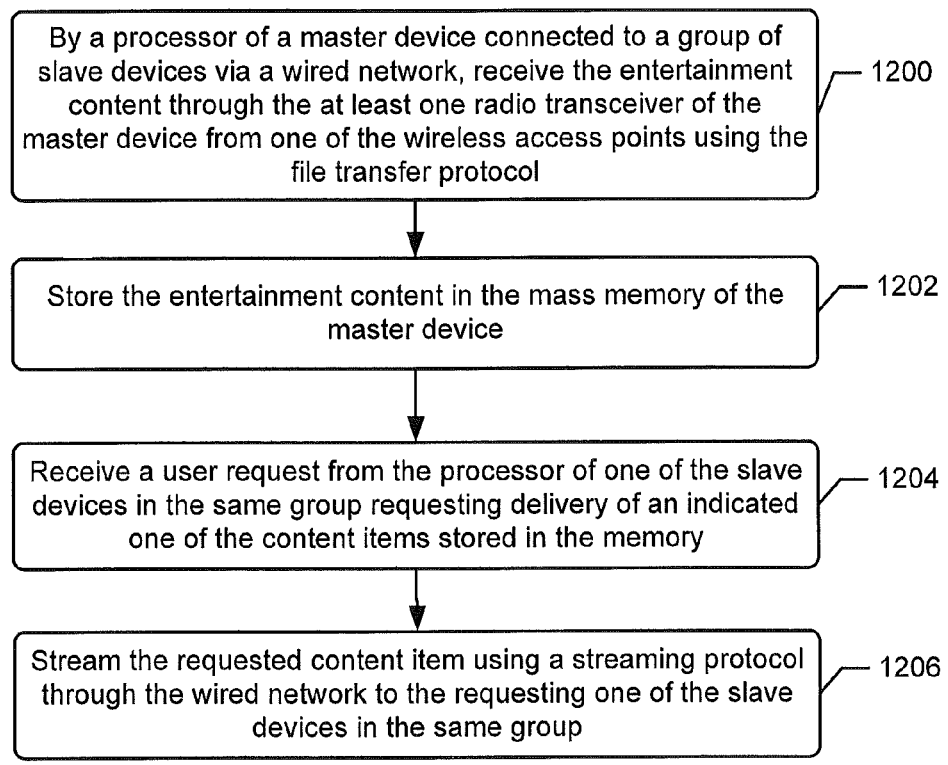

Referring to the embodiment of FIG. 12, the processor of the master device is configured to receive (block 1200 the entertainment content through the at least one radio transceiver of the master device from one of the SWAPs 110 using the file transfer protocol, to store (block 1202) the entertainment content in the mass memory of the master device, to receive (block 1204) a user request from the processor of one of the slave devices in the same group requesting delivery of an indicated one of the content items stored in the memory, and to stream (block 1206) the requested content item using a streaming protocol through the wired network interface and the wired network to the requesting one of the slave devices in the same group.

Controlling RF Channels Based on the Operational State of the System

A SWAP 110 can include a plurality of radio transceivers, each configured to communicate within a different frequency band. In one embodiment, the SWAPs 110 each have three radio transceivers. For example two of the radio transceivers can operate at 2.4 GHz and 5 GHz to provide increased communication bandwidth for transferring content to seat display devices 114. The third radio transceiver can be used for real-time steaming of radio audio, live TV channels, or other programming from a SWAP 110 to seat display devices 114. All three radios can be used simultaneously when loading content items from the wireless loader device 120 to a SWAP 110 and/or to transfer content from one SWAP 110 to another SWAP 110 within the aircraft. Similarly, all three radios can be used simultaneously when loading content items from a SWAP 110 into one or more display devices 114 for subsequent playing.

During flight after content items have been loaded from the loader device 120 to the SWAPs 110, communication resources of the radio transceivers can be shared between streaming content items to the PEDs 116, loading content items onto the seat display devices 114, and providing passenger services (e.g., attendant call notification messages, controlling overhead reading lights, communicating passenger announcements, etc.).

FIG. 2 illustrates wireless communication coverage areas 210, 212, 214 provided by three conventional WAPs within an aircraft fuselage 200. As illustrated, the coverage areas 210, 212, 214 substantially overlap which requires use of different frequency bands by the overlapping WAPs to avoid excessive interference between their communications and associated degraded data bandwidth with higher error rates.

FIG. 3 illustrates the operation of three SWAPs that are configured to provide substantially non-overlapping coverage areas 300, 302, 304 in accordance with some embodiments of the present disclosure. FIG. 4 illustrates the operation of seven SWAPs that are configured to provide substantially non-overlapping coverage areas 400, 402, 404, 406, 408, 410, 412 in a dense communication environment (e.g., within a Boeing 777 aircraft having a large number of seats) in accordance with some embodiments of the present disclosure.

The SWAPs 110 can have radio transceivers and associated antennas that are controlled by operations that provide substantially non-overlapping service areas. The operations may include dynamically controlling transmitter power by one SWAP 110 based on received signal feedback from an adjacent SWAP 110. The operations may alternatively or additionally include avoiding use of particular frequencies that are determined to contain excessive transmission interference from an adjacent SWAP 110. The operations may alternatively or additionally include dynamically controlling a modulation-coding scheme that one SWAP 110 applies to encode content data for transmission based on interference that it measures in signals transmitted by an adjacent SWAP 110.

The SWAPs 110 may communicate information between them through wireless or wired interfaces that cause the SWAPs 110 to coordinate assignment of identified seat display devices 114 and/or PEDs 116 to different ones of the SWAPs 110 to provide efficient and reliable servicing of seat display devices 114 and/or PEDs 116 near edge regions between the coverage areas.

For example, the SWAPs 110 are spaced apart in the aircraft fuselage 200 to create adjacent service areas in which entertainment services are provided to the seat display devices 114 and PEDs 116. A SWAP 110 can perform operations to determining which of the seat display devices 114 and PEDs 116 are located within near an edge of a service area or within an overlapping service area of an adjacent SWAP 110, and communicate an assignment message to the adjacent SWAP 110 to coordinate assignment of those seat display devices 114 and PEDs 116 to one or the other SWAP 110. A SWAP 110 can then adjust its transmitter power to expand or contract their coverage area to provide sufficient transmitter signal power (but not excessive transmitter signal power) to the seat display devices 114 and PEDs 116 that it is assigned to serve.

In a further embodiment, the SWAPs 110 may contain different locally stored content items, and may coordinate assignment of a seat display device 114 or PED 116 from a first SWAP 110 to an adjacent second SWAP 110 when the seat display device 114 or PED 116 requests a content item that is not present in local storage of the first SWAP 110 but is present in the local storage of the first SWAP 110. In this manner, the seat display device 114 or PED 116 can be handed off from the first SWAP 110 to the second SWAP 110 to receive the requested content item. Alternatively or additionally, the second SWAP 110 may transfer the requested content item through a wireless interface or a wired interface to the first SWAP 110 to enable the first SWAP 110 to provide the requested content item directly to the seat display device 114 or PED 116.

In one embodiment, each of the SWAPs 110 are configured to be mounted at spaced apart locations within an aircraft fuselage to provide entertainment services to passengers within the aircraft. The processor 500 of each of the SWAPs 110 is configured to perform antenna beam forming that increases transceiver 520 signal strength in a direction along the fuselage and reduces transceiver signal strength in a direction across the fuselage while the SWAPs 110 are mounted at the spaced apart locations within the aircraft fuselage.

The processor of each of the SWAPs 110 may be configured to coordinate with an adjacent one of the SWAPs 110 to determine which of a plurality of different frequency bands are allocated for use by the adjacent one of the wireless access points to reduce co-channel interference during their communications with seat display devices 114.

The processor of each of the SWAPs 110 may be configured to determine co-channel interference from an adjacent one of the SWAPs 110, and to control transmission power through the at least one radio transceiver 520 based on the co-channel interference.

The processor of each of the SWAPs 110 may be configured to measure interference from signals transmitted by an adjacent one of the SWAPs 110, and to control a modulation-coding scheme applied to encode entertainment content transmitted through the at least one radio transceiver 520 based on the interference.

The processor 500 of each of the SWAPs 110 may be configured to measure signals transmitted by the personal electronic devices 116, and to coordinate with an adjacent one of the SWAPs 110 a determination, based on the measured signals, of which of the personal electronic devices 116 are assigned to which of the coordinating SWAPs 110 for the streaming of content items. Thus, adjacent SWAPs 110 may operate to coordinate the assignment of personal electronic devices 116 and/or seat display devices 114 for servicing by which of the adjacent SWAPs 110. Such coordinated assignment can be beneficial to reducing overlap between the coverage areas, such as shown by the reduced overlap of coverage areas in FIGS. 3 and 4.

Alternatively, the SWAPs 110 may select among the personal electronic devices 116 and/or the seat display devices 114 based signal measurements. For example, the processor 500 of a SWAP 110 may be configured to measure signals transmitted by the personal electronic devices 116 and/or the seat display devices 114, and determine, based on the measured signals, which of the personal electronic devices 116 and/or the seat display devices 114 it will service. This assignment approach may operate to reduce transmitted signal power levels and therefore reduce interference to concurrent communications occurring between other SWAPs 110 their serviced seat display devices 114 and/or personal electronic devices 116.

SWAP Configuration

FIG. 5 is a block diagram of a SWAP 110 that is configured according to some embodiments of the present disclosure. The SWAP 110 can be a self-contained device that includes at least one processor 500, a memory 510, one or more radio transceivers ("radio") 520a, 520b, . . . 520n, a power supply 530, and a connection interface 540. In at least one embodiment, a housing encloses these components, and may be configured to be mounted to a ceiling of a vehicle, such behind a protective liner within an aircraft fuselage or within an equipment compartment.

The processor 500 may include one or more data processing circuits, such as a general purpose and/or special purpose processor (e.g., microprocessor and/or digital signal processor) that may be collocated or distributed across one or more networks. The processor 500 is configured to execute computer readable program code in the memory 510, described below as a computer readable medium, to perform some or all of the operations and methods that are described herein for one or more of the embodiments.

The processor 510 can operate to provide a server function 502 to receive and store content items from a loader device and/or server device located in the aircraft, and to provide content items to the seat display devices 114 and PEDs 116 via the radio transceivers 520a, 520b, . . . 520n. The processor 510 provides a radio management function 504 that controls the radio transceivers 520a, 520b, 520n to setup, maintain, and terminate communication links to the seat display devices 114 and PEDs 116, and further operate to provide transmitter power management, transmitter/receiver frequency selection, antenna beam forming, and other operations disclosed herein for the SWAP 110 that can include coordinated operation between the SWAPs 110 to avoid interference therebetween.

A switch function 506 can operate to route data, including content items, commands, etc. through the network 546 of the connection interface 540 to provide operations described herein.

The memory 510 can be mass data storage device having sufficient data storage capacity to store a plurality of audio content (e.g., songs, etc.), audio-video content (e.g., movies, television programs, etc.), and/or games or other applications which can be downloaded to a video display device 114 for playback to and/or operation by a passenger. The memory 510 can be sufficiently large to store all movies, television shows, applications, and other content items that will be offered to passengers during flight.

The radio transceivers ("radio") 520a, 520b, . . . 520n may provide wireless RF communications to the seat display devices 114, and may further provide wireless communications with the wireless loader device 120. One or more of the radio transceivers ("radio") 520a, 520b, . . . 520n may operate according to a WiFi technologies such as 802.11n, 802.11ac, etc, and/or a cellular transceiver that operates according to one or more cellular radio access technologies that may include, but are not limited to, wideband-Code Division Multiple Access (CDMA), CDMA2000, Universal Mobile Telecommunications System (UMTS), and/or 3rd Generation Partnership Project (3GPP) Long Term Evolution (LTE).

The connection interface 540 can include a power interface 542, a discrete signal interface 544, and may further include network interface 546. The power interface 542 is connected to receive power from a centralized power supply 130 of the aircraft, which is further converted and conditioned by a power supply 530. The discrete signal interface 544 is connected to receive aircraft/crew control signals and may receive public announcement audio which is relayed to the seat display devices 114 for playback to passengers.

The network interface 546 may be a thin wire Ethernet or other wired network connection and/or a wireless RF transceiver that operates to interconnect the SWAPs 110 to allow shared control of their respective service area sizes to avoid unnecessary overlap, such as by provide feedback from one SWAP to an adjacent SWAP of measured interference caused by the adjacent SWAP and/or to enable coordinate of transmitter power levels to reduce/avoid interference therebetween, and/or to allow a SWAP 110 to adjust its direction antenna beam forming to reduce/avoid interference to an adjacent SWAP 110 and/or to compensate for interference from the adjacent SWAP 110. The SWAPs 110 may communicate with each other to exchange information enabling operation to coordinate allocation of transmit and/or receive frequencies between adjacent SWAPs 110 to reduce/avoid communication interference therebetween. The SWAPs 110 may communicate with each other to exchange information enabling coordinated assignment of identified seat display devices 114 and/or PEDs 116 to different ones of the SWAPs 110 to provide efficient and reliable servicing of seat display devices 114 and/or PEDs 116 near edge regions between the coverage areas.

The network interface 546 may connect to overhead display devices (e.g., ceiling mounted displays) to allow transfer of video content from the SWAP 110 for display on the overhead display devices. The network interface 546 can include a physical wired data communication interface (e.g., USB) configured to communicate with a wired content loader device 120 to receive content.

The network interface 546 may connect to one or more content servers to receive content items that are then locally stored for subsequent download as a group of content items to the seat display devices 114 for subsequent selection among by passengers, or downloaded on-demand to one of the seat display devices 114 responsive to a passenger selection of an individual content item.

The electronic components illustrated in FIG. 5 can be enclosed within a shared housing that is installed in a ceiling of the aircraft fuselage 200. Accordingly, a plurality of the SWAPs 110 can be deployed in the aircraft fuselage 200 by installing the separate housings at spaced part locations, such as within ceiling bays.

Additional SWAP Functions

As explained above, SWAPs 110 provide a communication pathway for installing content items from an external source (loader device 120) to the seat display devices 114. The content items, can be loaded onto a SWAP 110 over a wired or wireless link from a loader device 120, and then downloaded from the SWAP 110 to the seat display devices 114 over the wireless link 112, which may be the same link used to load the content items from the loader device 120. Operations for downloading content items from a SWAP 110 to the seat display devices 114 can be performed as a maintenance level background task as the content items are being loaded to the SWAP 110 from loader device 120. Accordingly, communication resources and processing operations for loading content items from the loader device 120 to the SWAP 110 can be provided a higher priority of operation than for loading content items from the SWAP 110 to the seat display devices 114. Upon completion of the transfer of content items from the loader device 120 to the SWAP 110, any ongoing transfer of content items from the SWAP 110 to the seat display devices 114 can be increased in operational priority, e.g., from the maintenance level background task to a non-maintenance level background task (e.g., because no human intervention is required). The communication resources and processing operations can then be prioritized for use in transferring content to the seat display devices 114.

The SWAP 110 can also provide content streaming capabilities to PEDs 116, such as explained above. From the client standpoint, the SWAPs 110 are configured to appear as a compound content repository, because the client does not know where to stream content from, and which is abstracted by the SWAPs 110.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. An entertainment system comprising:
a plurality of wireless access points, each wireless access point comprising:
a mass memory;
at least one radio transceiver configured to communicate with seat display devices and to communicate with personal electronic devices of users; and
at least one processor configured to:
receive entertainment content comprising a plurality of content items through the at least one radio transceiver;
store the entertainment content in the mass memory;
download entertainment content using a file transfer protocol from the mass memory to the seat display devices through the at least one radio transceiver;
stream content items of the entertainment content using a streaming protocol from the mass memory to the personal electronic devices of users through the at least one radio transceiver;
receive user requests from the personal electronic devices, each user request from the personal electronic devices requesting delivery of a respectively indicated one of the content items stored in the mass memory, and to concurrently stream the requested content items using a streaming protocol through the at least one radio transceiver to the requesting personal electronic devices; and
allocate resources of the at least one radio transceiver to cause the downloading of the entertainment content using the file transfer protocol through the at least one radio transceiver to the seat display devices to occur at a lower priority than the concurrent streaming of the requested content items using the streaming protocol through the at least one radio transceiver to the requesting personal electronic devices.

2. The entertainment system of claim 1, wherein:
each of the wireless access points comprises a housing that encloses the mass memory, the at least one radio transceiver, and the at least one processor.

3. The entertainment system of claim 2, wherein:
each of the wireless access points are configured to be mounted at spaced apart locations within an aircraft fuselage to provide entertainment services to passengers within the aircraft.

4. The entertainment system of claim 3, wherein:
the at least one processor of each of the wireless access points is further configured to perform antenna beam forming that increases transceiver signal strength in a direction along the fuselage and reduces transceiver signal strength in a direction across the fuselage while the wireless access points are mounted at the spaced apart locations within the aircraft fuselage.

5. The entertainment system of claim 3, wherein:
the at least one processor of each of the wireless access points is further configured to coordinate with an adjacent one of the wireless access points to determine which of a plurality of different frequency bands are allocated for use by the adjacent one of the wireless access points to reduce co-channel interference during their communications with seat display devices.

6. The entertainment system of claim 3, wherein the at least one processor of each of the wireless access points is further configured to:
determine co-channel interference from an adjacent one of the wireless access points; and
control transmission power through the at least one radio transceiver based on the co-channel interference.

7. The entertainment system of claim 3, wherein the at least one processor of each of the wireless access points is further configured to:
measure interference from signals transmitted by an adjacent one of the wireless access points; and
control a modulation-coding scheme applied to encode entertainment content transmitted through the at least one radio transceiver based on the interference.

8. The entertainment system of claim 1, wherein:
the at least one processor of each of the wireless access points is further configured to prevent streaming of content items of the entertainment content to the personal electronic devices until completion of the downloading of the entertainment content to the seat display devices.

9. The entertainment system of claim 1, wherein:
the at least one processor of each of the wireless access points is further configured to allocate resources of the at least one radio transceiver to provide a quality of service during the downloading of the entertainment content to the seat display devices using the file transfer protocol that is insufficient for real time viewing while the downloading of the entertainment content is occurring, while concurrently providing a quality of service during the streaming of the requested content items through the at least one radio transceiver to the requesting personal electronic devices that is sufficient for real time viewing during the streaming of the requested content items.

10. An entertainment system comprising:
a plurality of wireless access points, each wireless access point comprising:
a mass memory;
at least one radio transceiver configured to communicate with seat display devices and to communicate with personal electronic devices of users; and
at least one processor configured to:
receive entertainment content comprising a plurality of content items through the at least one radio transceiver;
store the entertainment content in the mass memory;
download entertainment content using a file transfer protocol from the mass memory to the seat display devices through the at least one radio transceiver;
stream content items of the entertainment content using a streaming protocol from the mass memory to the personal electronic devices of users through the at least one radio transceiver; and
receive user requests from the personal electronic devices, each user request from the personal electronic devices requesting delivery of a respectively indicated one of the content items stored in the mass memory, and to concurrently stream the requested content items using a streaming protocol through the at least one radio transceiver to the requesting personal electronic devices,
wherein the plurality of wireless access points are communicatively connected in a series, wherein the at least one processor of at least some of the wireless access points is further configured to:
download updated content items from an upstream wireless access point using the file transfer protocol through the at least one radio transceiver;
select a subset of the updated content items that do not reside in the mass memory;
store the subset of the updated content items in the mass memory; and
transmit the updated content items to a downstream wireless access point using a file transfer protocol through the at least one radio transceiver.

11. The entertainment system of claim 10, wherein the at least one processor of at least one of the wireless access points is further configured to:
download the updated content items from a wireless mobile loader device using a file transfer protocol through the at least one radio transceiver; and
transmit the updated content items to a downstream wireless access point using a file transfer protocol through the at least one radio transceiver; and
while receiving the updated content items from the wireless mobile loader device, allocate resources of the at least one radio transceiver to the downloading the updated content items from the wireless mobile loader device and the transmitting the updated content items to the downstream wireless access point while preventing use of the resources of the at least one radio transceiver for concurrent downloading of the entertainment content using the file transfer protocol through the at least one radio transceiver to the seat display devices and while preventing concurrent streaming of the content items using the streaming protocol through the at least one radio transceiver to the personal electronic devices.

12. The entertainment system of claim 10, wherein the at least one processor of the at least one of the wireless access points is further configured to:
download operational software from the wireless mobile loader device using a file transfer protocol through the at least one radio transceiver;
transmit the operational software to a downstream wireless access point using a file transfer protocol through the at least one radio transceiver; and
transmit the operational software to the seat display devices using a file transfer protocol through the at least one radio transceiver.

13. The entertainment system of claim 10, wherein the at least one processor of each of the wireless access points is further configured to:
allocate resources of the at least one radio transceiver to prioritize the downloading and the transmitting of the updated content items over any concurrent downloading of the entertainment content using the file transfer protocol through the at least one radio transceiver to the requesting seat display devices.

14. The entertainment system of claim 10, wherein:
each of the wireless access points further comprises a plurality of the radio transceivers;
the at least one processor of at least one of the wireless access points is further configured to:
based on at least one of the updated content items remaining to be downloaded from the wireless mobile loader device, prioritize allocation of resources of all the radio transceivers to receiving the updated content items from the wireless mobile loader device over any transmitting of the updated content items to the downstream wireless access point;
based on completing the downloading of the updated content items, prioritize allocation of resources of all the radio transceivers to transmitting the updated content items to the downstream wireless access point using the file transfer protocol over any streaming of content items using the streaming protocol to the personal electronic devices; and based on completing the transmitting the updated content items to the downstream wireless access point, prioritize allocation of resources of at least one of the radio transceivers to the downloading of the entertainment content using the file transfer protocol to the seat display devices and allocation of resources of at least one other one of the radio transceivers to the streaming of the content items using the streaming protocol to the personal electronic devices.

15. An entertainment system comprising:

a plurality of wireless access points, each wireless access point comprising:
- a mass memory;
- at least one radio transceiver configured to communicate with seat display devices and to communicate with personal electronic devices of users; and
- at least one processor configured to:
  - receive entertainment content comprising a plurality of content items through the at least one radio transceiver;
  - store the entertainment content in the mass memory;
  - download entertainment content using a file transfer protocol from the mass memory to the seat display devices through the at least one radio transceiver;
  - stream content items of the entertainment content using a streaming protocol from the mass memory to the personal electronic devices of users through the at least one radio transceiver,
  - receive user requests from the personal electronic devices, each user request from the personal electronic devices requesting delivery of a respectively indicated one of the content items stored in the mass memory, and to concurrently stream the requested content items using a streaming protocol through the at least one radio transceiver to the requesting personal electronic devices; and
  - respond to a user request from one of the personal electronic devices and a determination that a content item identified by the user request is not stored among the entertainment content in the mass memory by obtaining the content item from the mass memory of another one of the wireless access points, storing the content item in the mass memory of the obtaining wireless access point, and streaming the content item using the streaming protocol from the mass memory of the obtaining wireless access point through the at least one radio transceiver to the one of the personal electronic devices.

16. An entertainment system comprising a plurality of wireless access points, each wireless access point comprising:
- a mass memory;
- at least one radio transceiver configured to communicate with seat display devices and to communicate with personal electronic devices of users; and
- at least one processor configured to:
  - receive entertainment content comprising a plurality of content items through the at least one radio transceiver;
  - store the entertainment content in the mass memory;
  - download entertainment content using a file transfer protocol from the mass memory to the seat display devices through the at least one radio transceiver;
  - stream content items of the entertainment content using a streaming protocol from the mass memory to the personal electronic devices of users through the at least one radio transceiver;
  - receive user requests from the personal electronic devices, each user request from the personal electronic devices requesting delivery of a respectively indicated one of the content items stored in the mass memory, and to concurrently stream the requested content items using a streaming protocol through the at least one radio transceiver to the requesting personal electronic devices; and
  - respond to a user request from one of the seat display devices that identifies a content item that is not stored among the entertainment content in the mass memory by obtaining the content item from the mass memory of another one of the wireless access points, storing the content item in the mass memory of the obtaining wireless access point, and streaming the content item using the streaming protocol from the mass memory of the obtaining wireless access point through the at least one radio transceiver to the one of the seat display devices.

17. An entertainment system comprising a plurality of wireless access points, each wireless access point comprising:
- a mass memory;
- at least one radio transceiver configured to communicate with seat display devices and to communicate with personal electronic devices of users; and
- at least one processor configured to:
  - receive entertainment content comprising a plurality of content items through the at least one radio transceiver;
  - store the entertainment content in the mass memory;
  - download entertainment content using a file transfer protocol from the mass memory to the seat display devices through the at least one radio transceiver;
  - stream content items of the entertainment content using a streaming protocol from the mass memory to the personal electronic devices of users through the at least one radio transceiver; and a plurality of the seat display devices, wherein the plurality of the seat display devices are grouped with one of the seat display devices in each of the groups operating as a master device and the other seat display devices in each of the groups operating as slave devices;

wherein the plurality of the seat display devices comprise at least one radio transceiver, at least one processor, a mass memory, and a wired network interface;

wherein the master device communicates with the slave devices in the same group through the wired network interface via a wired network, wherein the wired networks of each of the groups are not directly communicatively connected;

wherein the at least one processor of the master device is configured to receive the entertainment content through the at least one radio transceiver of the master device from one of the wireless access points using the file transfer protocol, store the entertainment content in the mass memory of the master device; receive a user request from the at least one processor of one of the slave devices in the same group requesting delivery of an indicated one of the content items stored in the memory, and to stream the requested content item using a streaming protocol through the wired network interface and the wired network to the requesting one of the slave devices in the same group.

18. An inflight entertainment system comprising:
a plurality of wireless access points, each wireless access point comprising:
  a mass memory;
  at least one radio transceiver configured to communicate with another one of the wireless access points and to communicate with seat display devices and personal electronic devices of users; and
  at least one processor configured to:
    receive entertainment content comprising a plurality of content items through the at least one radio transceiver;
    store the entertainment content in the mass memory;
    communicate entertainment content from the mass memory to another one of the wireless access points through the at least one radio transceiver;
    receive user requests from the seat display devices, each user request requesting delivery of a respectively indicated one of the content items stored in the mass memory, and to concurrently download the requested content items using a file transfer protocol through the at least one radio transceiver to the requesting seat display devices;
    receive user requests from the personal electronic devices, each user request from the personal electronic devices requesting delivery of a respectively indicated one of the content items stored in the mass memory, and to concurrently stream the requested content items using a streaming protocol through the at least one radio transceiver to the requesting personal electronic devices; and
    allocate resources of the at least one radio transceiver to cause the concurrent downloading of the requested content items using the file transfer protocol through the at least one radio transceiver to the requesting seat display devices to occur at a lower priority than the concurrent streaming of the requested content items using the streaming protocol through the at least one radio transceiver to the requesting personal electronic devices,
  wherein each of the wireless access points comprises a housing that encloses the mass memory, the at least one radio transceiver, and the at least one processor;
  wherein each of the wireless access points are configured to be mounted at spaced apart locations within an aircraft fuselage to provide entertainment services to passengers within the aircraft;
wherein the plurality of wireless access points are communicatively connected in a series, wherein the at least one processor of at least one of the wireless access points is further configured to:
  receive updated content items from a wireless mobile loader device, which is transportable onto the aircraft, using the file transfer protocol through the at least one radio transceiver,
  select a subset of the updated content items that do not reside in the mass memory;
  store the subset of the updated content items in the mass memory; and
  transmit the updated content items to a downstream wireless access point using a file transfer protocol through the at least one radio transceiver.

* * * * *